United States Patent

[11] 3,594,780

[72] Inventors Johannes Anton Greefkes;
Henricus Petrus Johannes Boudewijns,
both of Emmasingel, Eindhoven,
Netherlands

[21] Appl. No. 757,018
[22] Filed Sept. 3, 1968
[45] Patented July 20, 1971
[73] Assignee U.S. Philips Corporation
New York, N.Y.
[32] Priority Sept. 2, 1967
[33] Netherlands
[31] 6712081

[54] DIGITAL TO ANALOG CONVERTER HAVING CAPACITOR CHARGED BY INPUT CODE PULSES
11 Claims, 4 Drawing Figs.

[52] U.S. Cl. 340/347 DA
[51] Int. Cl. H03k 13/10
[50] Field of Search 340/347, 347 DA

[56] References Cited
UNITED STATES PATENTS

| | | | |
|---|---|---|---|
| 2,807,715 | 9/1957 | Lesti | 328/119 |
| 3,184,734 | 5/1965 | Uren et al. | 340/347 |

OTHER REFERENCES

" Multichannel Modulation System," BELL SYSTEM TECHNICAL JOURNAL, Vol. 27, pp. 36— 38, Jan. 1948. (copies included).

*Primary Examiner*—Maynard R. Wilbur
*Assistant Examiner*—Gary R. Edwards
*Attorney*—Frank R. Trifari

ABSTRACT: A digital to analog converter for sequential weighted pulse groups features a capacitor coupled to a resistor ladder network. The pulses are applied to a distributor and then to a pulse circuit which charges the capacitor from different points on the network depending upon the weighted value of the pulse.

Figure 1:
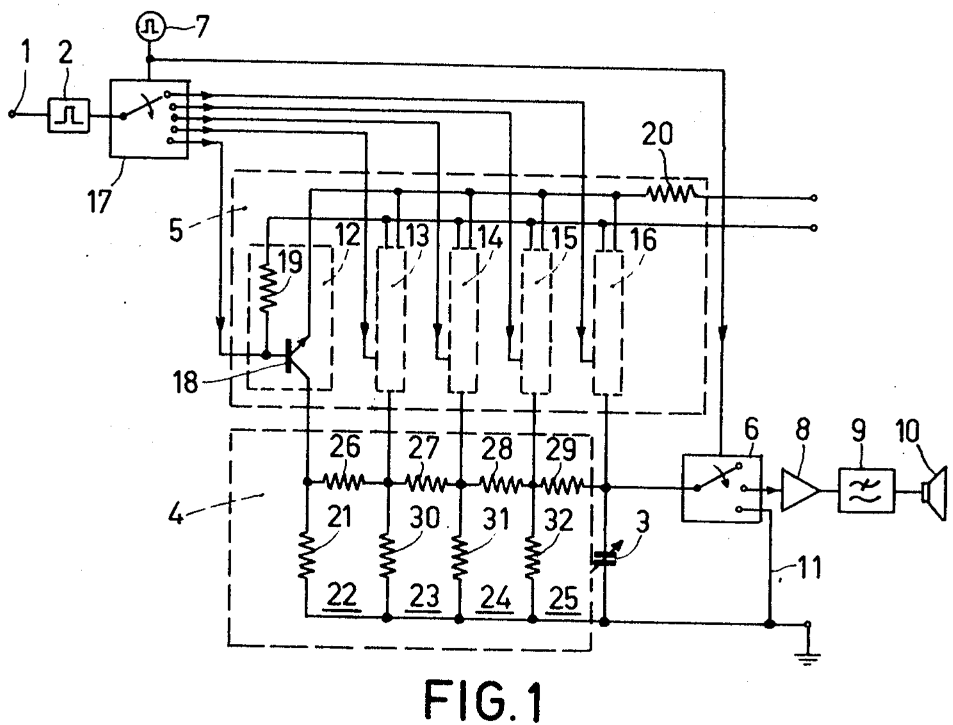

INVENTORS
JOHANNES A. GREEFKES
HENRICUS P. J. BOUDEWIJNS
BY
Frank R. Trifari
AGENT INVENTORS
JOHANNES A. GREEFKES
HENRICUS P. J. BOUDEWIJNS
BY
Frank R. Trifari
AGENT

DIGITAL TO ANALOG CONVERTER HAVING CAPACITOR CHARGED BY INPUT CODE PULSES

The invention relates to a device including a converter for converting periodical code groups consisting of a plurality of successive pulses of different weight which, due to their presence and absence, characterize an analogue signal to be transmitted into the analogue signals characterized by these code groups, comprising a capacitor, a discharge circuit connected parallel to the capacitor and a pulse circuit controlled by the pulses of the code groups which circuit varies the load of the capacitor by a certain load quantity whenever a pulse occurs, while in addition a sample is connected to the capacitor and controlled by sampling pulses occurring in the rhythm of the code groups.

The transmission of analogue signals by means of such periodical code groups consisting of a plurality of successive pulses of different weight is known under the name of pulse code modulation transmission and is used, for example, for the transmission of measuring signals, speech signals, television signals and the like. In practice substantially two different methods of transmission are used, namely in the one method of transmission the weight of the successive pulses in a code group increases according to a certain weight factor and in the other method of transmission decreases according to a certain weight factor, for which a factor 2 is common practice.

A known converter of the kind mentioned in the preamble for the conversion of code groups of which the weight of the successive pulses increases, for example, by a factor 2 is the Shannon decoder. In this decoder the conversion of the code groups is obtained by proportioning the discharge-time constant of the capacitor and the resistor connected parallel thereto in a special manner, namely such that the voltage across the capacitor has decreased to half its initial value within the time interval between two successive pulses in a code group. The advantage of the Shannon decoder described is its remarkable simplicity but this is offset by the fact that its applicability is only limited, this converter is particularly unsuitable for conversion of code groups of which the successive pulses in a code group decreases in weight.

It is an object of the invention to provide a different conception of a device of the kind mentioned in the preamble, which in addition to, simplicity of construction, flexibility and easy possibility of adjustment, is universally usable for the various methods of transmission and due to its universal character can be used at both the receiver end and the transmitter end.

The device according to the invention is characterized in that a plurality of parallel connected branches in the form of a resistor network is connected to connection points of the discharge circuit of the capacitor, an energy source and an electronic switch being included in each branch, said parallel connected branches forming part of the pulses circuit controlled by the pulses of the code groups, the pulse circuit furthermore being provided with a pulse commutator distributing the pulses in a code group over a number of output lines which are each connected to one of the said parallel connected branches as a control circuit for the electronic switch included in the said parallel connected branches, which switch connects the energy source included in said parallel connected branch, in a conducting manner to the capacitor only when a pulse occurs in the relevant control circuit.

Figure 2:
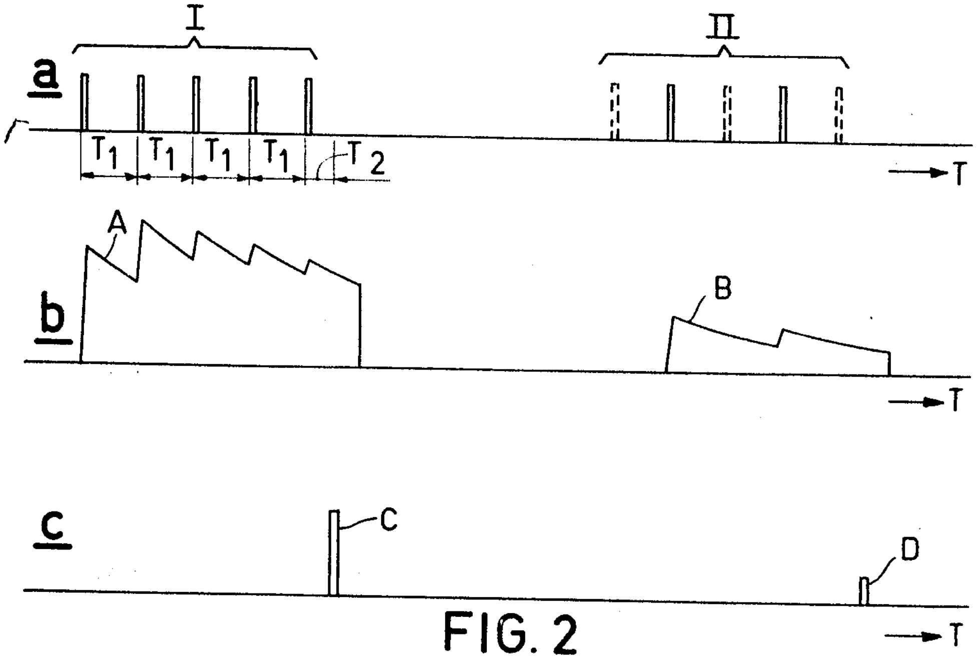
Figures 3, 4:
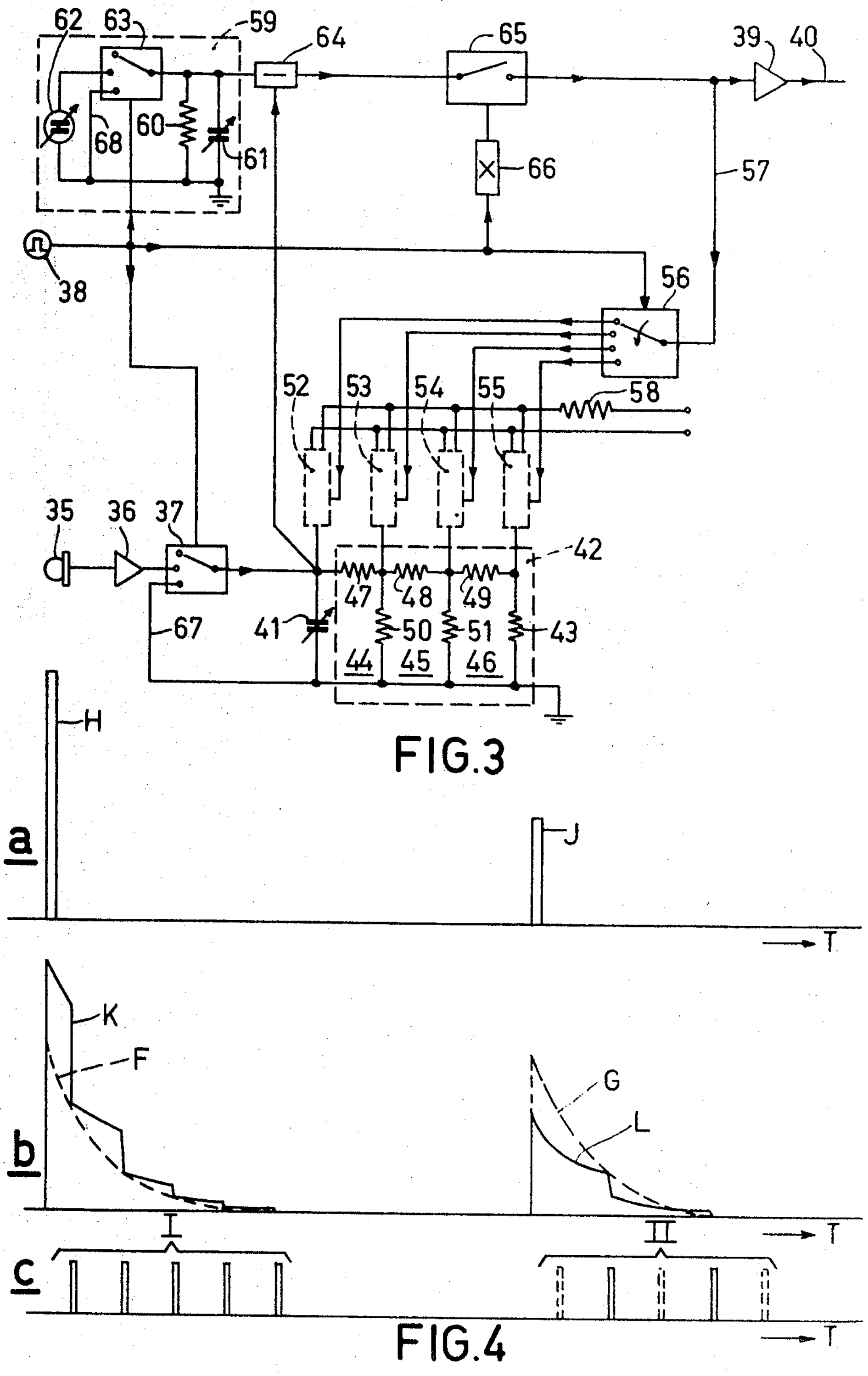

In order that the invention may be readily carried into effect, it will now be described in detail, by way of example, with reference to the accompanying diagrammatic drawings, in which FIG. 1 shows a receiver for pulse code modulation provided with a device according to the invention, while FIG. 2 shows a few time diagrams serving to explain of the device shown in FIG. 1;

FIG. 3 shows a transmitter for pulse code modulation provided with a device according to the invention, while FIG. 4 shows a few time diagrams serving to explain of the device shown in FIG. 3.

FIG. 1 shows a receiver for the reception of digital signals in the form of periodical code groups composed of a plurality of pulses having a periodicity of, for example, 8 kc./s., including a converter constructed according to the invention for converting the received periodical code groups into the analogue signals, characterized by these code groups which are, for example, formed by speech signals in the band of 0.3—3.4 kc./s. The receiver is particularly constructed for reception of the code groups illustrated in FIG. 2*a*, consisting of no more than five successive pulses, the weight of which decreases by a factor of 2, for example, the code group I in which all pulses are present, characterizes a signal value in the coding unit $E$ of $(1.2^4+1.2^3+1.2^2+1.2^1+1.2^0)E=31\ E$, while the code group II, the second and fourth pulses present are shown by solid lines and the pulses absent are shown in broken lines, indicates a signal value of $(0.2^4+1.2^3+0.2^2+1.2^1+0.2^0)E=10\ E$.

In the receiver shown the pulses received through line 1 are applied after pulse generation to the code converter according to shape and instant of occurrence in a pulse generator 2, which converter is provided with a capacitor 3, a discharge circuit 4 connected parallel to the capacitor and a pulse circuit 5 controlled by the pulses of the code groups which varies the charge of the capacitor 3 by a certain quantity of charge whenever a pulse occurs.

After each occurrence of a code group an analogue signal characterized by this code group is produced at the capacitor 3 which signal is applied for further handling to a sampler 6 which is controlled by sampling pulses occurring in the rhythm of the code groups. The sampling pulses are derived from a local pulse generator 7 which is synchronized at the frequency of 8 kc./s. of the code groups, for example, by means of a synchronization pulse cotransmitted with the code groups or in a different known manner; the synchronization of the local pulse generator 7 is not important for good understanding of the invention, and will therefore not be dealt with further.

After the occurrence of each code group the sampler 6 supplies a sampling of the signal voltage occuring at the capacitor 3 which voltage is supplied through an amplifier 8 and a low-pass filter 9 to a reproducing device 10 while subsequently the capacitor 3 is connected to ground through line 11 for discharge thereof. Thus the speech signals in the band of 0.3—3.4 kc./s. characterized by the code groups are reproduced by the reproducing device 10 after digital-to-analog converter.

For obtaining a digital-to-analog converter which is universally usable, there are connected to connection points of the discharge circuit 4 of the capacitor 3 in the form of a resistor network five parallel connected branches 12, 13, 14, 15, 16 each including an energy source and an electronic switch which parallel connected branches 12, 13, 14, 15, 16 form part of the pulse circuit 5 controlled by the pulses of the code groups, the pulse circuit 5 furthermore being provided with a pulse commutator 17 controlled by the local pulse generator 7 which commutator distributes the pulses in a code group over five output lines each of which is connected to one of the parallel connected branches 12, 13, 14, 15, 16 as a control circuit for the electronic switch included in the said parallel connected branches, which switch connects the energy source included in said parallel connected branch in a conducting manner to the capacitor 3 only when a pulse occurs in the relevant control circuit. In the embodiment shown each energy source is in the form of a current source and combined in one unit with the associated electronic switch by using a transistor 18 in the manner as is illustrated in detail for the branch 12. Particularly a blocking voltage is set up at the base of each transistor 18 through a resistor 19 also one of the output lines of the pulse commutator 17 while the collectors of the transistors 18 are connected to the resistor network 4 and all transistors 18 have a common emitter resistor 20.

For conversion of the digital signals into the analogue signals characterized thereby the resistor network 4 is constructed as a ladder network terminated by a terminal resistor 21 and provided with four sections 22, 23, 24, 25 composed of series resistors 26, 27, 28, 29 and shunt resistors 30, 31, 32, the parallel connected branches 12, 13, 14, 15, 16 being connected to the ends of the sections 22, 23, 24, 25 of the ladder network which supplies a current pulse when a pulse of the pulse commutator 17 occurs, said current pulse reaching the capacitor 3 with a certain degree of attenuation dependent on the connection point of the relevant branch on the ladder network. More particularly a current pulse of the amplitude $V_e/R$ is supplied by each parallel connected branch 12, 13, 14, 15, 16 when a pulse of the pulse commutator 17 occurs, $V_e$ being the emitter voltage and R being the common emitter resistor 20, while the mutual ratio of the attenuation factors of the successive sections 22, 23, 24, 25 of the ladder network going to the capacitor 3, is rendered equal to a constant value $\alpha$. If, for example, the branch 16 causes the capacitor 3 to be charged with a quantity Q, then the branch 15 causes the capacitor 3 to be charged with a quantity $Q/\alpha$, the branch 14 causes a charge at a charge quantity $Q'\alpha^2$, and so on. With the aid of the ladder network 4 shown said constant mutual ratio of the attenuation factors of the successive sections 22, 23, 24, 25 of the ladder network going to the capacitor 3 is obtained in a simple manner by rendering the successive sections 22, 23, 24, 25 of the ladder network identical with one another.

For conversion of the code groups shown in FIG. 2*a* of which the weight of the successive pulses decreases according to the weight factor 2 the first pulse in a code group controls the branch 16, the second pulse controls the branch 15 and so on until the fifth pulse controls the branch 12 whereafter the cycle described is repeated when a following code group occurs, that is to say, that the branches 12, 13, 14, 15, 16 controlled by the pulses in a code group are connected to the capacitor 3 at smaller factors of attenuation as a function of the weight of the pulses. The operation of the code converter described so far will now be explained with reference to the time diagrams of the FIGS. 2*b* and 2*c* for the code groups shown in FIG. 2*a*, the voltage of the capacitor 3 being illustrated in FIG. 2*b* while the output pulses of the sampler 6 are shown in FIG. 2*c*.

If the code groups I and II in FIG. 2*a* are applied to the receiving device of FIG. 1, the voltage at the capacitor 3 will result in the waveform shown by A and B in FIG. 2*b*. Particularly for the code group I the branches will successively be released by the pulses in the code group in the order 16, 15, 14, 13, 12 charges Q, $Q/\alpha$, $Q/\alpha^2$, $Q/\alpha^3$, $Q/\alpha^4$ successively being applied to the capacitor 3. During the occurrence of the code group also a continuous discharge of the capacitor 3 takes place according to an *e*-power with a time constant $R_1C_1$, where $R_1$ is the input resistance of the ladder network 4 and $C_1$ the capacitance of the capacitor 3, said discharge continuing till the instant of sampling which always lies in a code group after a fixed time distance (sampling-time distance) from the final pulse. At the instant of sampling the sampler supplies an output pulse proportional to the capacitor voltage then occurring after which the capacitor 3 is discharged via the sampler 6 through line 11. FIG. 2*c* shows the output pulse C of the sampler 6 which pulse is applied to the reproducing device 10.

When the code group II occurs, the cycle described is repeated in essence, and particularly because only the second and the fourth pulses are present in the group II the branches 15 and 13 will be released by these pulses as a result of which charge quantities $Q/\alpha$ and $Q/\alpha^3$ are applied to the capacitor 3, thereby a continuous discharge till the instant of sampling occurring as in the foregoing group I, after which the capacitor 3 is discharged. The variation of the voltage on capacitor 3 is shown by B in FIG. 2*b*, while the output pulse D of the sampler 6 is shown in FIG. 2*c*.

As has been described in the foregoing and explained with reference to FIG. 2, digital-to-analog conversion in the digital-to-analog converter is based on the different laws of the charging and discharging processes, but it is also surprisingly possible to obtain an occurate digital-to-analog conversion by adapting the different laws of the charging process and the discharging process to each other which will now be demonstrated mathematically. For this purpose the time distance of two successive pulses in a code group is assumed to be $T_1$ and the time distance of the final pulse up to the instant of sampling is taken to be $T_2$.

If we start from the code group I then, as already stated, a charge Q will be applied to the capacitor 3 upon the first pulse corresponding to a pulsatory voltage increase V of the capacitor 3. At the instant of sampling which occurs at a time distance $4T_1+T_2$ after the first pulse, the voltage V of the capacitor 3 has decreased to the value: $V.e-(4T_1+T_2)/R_1C_1$ due to the discharge having the time constant $R_1C_1$.

On the second pulse of the code group I a charge $Q/\alpha$ is applied to the capacitor 3 corresponding to a pulsatory voltage increase of $V/\alpha$ which voltage increase has decreased due to the discharge process to the value $V/\alpha.e-(3T_1+T_2)/R_1C_1$ at the instant of sampling which now lies at a time distance $3T_1+T_2$.

The contribution of the 3rd, 4th and 5th pulses to the voltage of the capacitor 3 at the instant of sampling are calculated in the same manner the total capacitor voltage at the instant of sampling being obtained by adding together all these contributions, which voltage then is:

$$V.\underline{e}^{(4T_1+T_2)/R_1C_1}+V/\alpha.\underline{e}^{-(3T_1+T_2)/R_1C_1}+V/\alpha^2.\underline{e}^{-(2T_1+T_2)/R_1C_1}+V/\alpha^3.\underline{e}^{-(T_1+T_2)/R_1C_1}+V/\alpha^4.\underline{e}^{-T_2/R_1C_1} \quad \text{(I)}$$

For the digital-to-analog conversion said voltage must be directly proportional to the signal value characterized by this code group I which, as was already stated in the foregoing, is $(1.2^4+1.2^3+1.2^2+1.2^1+1.2^0)E=31\ E$, which condition essential to the digital-to-analog conversion is accurately fulfilled by adapting the attenuation factor $\alpha$ for the discharge process to the discharge-time constant $R_1C_1$ of the discharge process, particularly by rendering the attenuation factor $$\alpha=2.\underline{e}^{T_1/R_1C_1}.$$

In fact, at this value of the attenuation factor a voltage (I) of the capacitor 3 is obtained which is equal to:

$$V/2^4.\underline{e}^{-(4T_1+T_2)/R_1C_1}(1.2^4+1.2^3+1.2^2+1.2^1+1.2^0),$$

which is exactly the signal value characterized by the code group multiplied by the factor:

$$V/2^4.\underline{e}^{-(4T_1+T_2)/R_1C_1}$$

which occurs as a constant factor upon conversion of the code groups into the corresponding analogue value. For example, a voltage of $$V/2^4.\underline{e}^{-(4T+T_2)R_1C_1}$$

$(0.2^4+1.2^3+0.2^2+1.2^1+0.2^0)$ at the capacitor 3 occurs upon conversion of the group II.

For a code group a voltage will always occur at the capacitors at the instant of sampling which is equal to the signal value S of the code group multiplied by the constant factor of conversion $$V/2^4.\underline{e}^{-(4T_1+T_2)/R_1C_1}$$

or in the form of a formula: $S.V/2^4.e-(4T+T_2)/R_1C_1$. (II)

For completeness sake it is noted that this formula (II) exactly applies both for infinitely narrow pulses in the code groups and for pulses of random shape: in case of infinitely narrow pulses the value $V=Q/C$ can be taken for the voltage $V$ and in case of pulses of random shape this voltage $V$ is multiplied by a certain correction factor which is dependent on the shape of the pulses.

In this manner the digital-to-analog conversion of the received code groups is brought about by mutual adaptation of the attenuation factor $\alpha$ and time constant $R_1C_1$ of the network 3,4. Both values $\alpha$ and $R_1C_1$ are determined by the network 3,4 and hence the digital-to-analog conversion in this digital-to-analog converter is also determined exclusively by the network 3,4 composed of passive elements, is being also possible in a simple manner to adjust the accuracy of the digital-to-analog converter to an optimum value by using capacitor 3 of the variable type since the desired relation between charging and discharging processes can be adjusted accurately by adjustment of the capacitor 3. Within the given proportioning prescription of the shown digital-to-analog converter in which for an accurate digital-to-analog conversion a certain attenuation factor $\alpha$ is associated with a certain discharge-time constant $R_1C_1$ of the network one has still the freedom to obtain a maximum efficiency of conversion. In fact by rendering the discharge-time constant $R_1C_1$ approximately equal to the time distance between the first pulse of the code group and the instant of sampling it can be achieved, as can be shown mathematically and also experimentally, that a maximum voltage is derived from the capacitor 3 at the instant of sampling as a function of the voltages occurring at the ends of the sections 22, 23, 24 of the ladder network 4, which voltages are produced by the current pulses of the parallel connected branches 15, 14, 13, 12. According to this prescription the discharge-time constant $R_1C_1$ must be rendered approximately equal to, $4\ T_1+T_2$ in the embodiment described.

Together with the advantages already mentioned of the converter shown, in particular exclusive dependence upon passive elements, simple possibility of adjustment to an optimally accurate digital-to-analog conversion and a maximum efficiency of conversion, the digital-to-analog converter according to the invention is universally usable in its application, particularly it can also be used for the digital-to-analog conversion of code groups, of which the weight of the successive pulses increases by a weight factor of, for example, 2. In this case the branches controlled by the pulses in a code group are also connected to the capacitor 3 in accordance with the weight of these pulses having smaller factors of attenuation which means in this case that the first pulse of the code group is applied to the branch 12, the second pulse to the branch 13, the third pulse to the branch 14 and so on, while the mutual ratio of the attenuation factors is in this case rendered equal to $\alpha=2\ e-T_1/R_1C_1$.

The following data are mentioned of a converter extensively tested in practice:

| | |
|---|---|
| series resistors 26, 27, 28, 29: | 5.6 kOhms |
| shunt resistors 30, 31, 32: | 8.2 kOhms |
| terminal resistor 21: | 3.9 kOhms |
| capacitor 3: | 10.000 pf. |

Due to the universal character of the converter shown in FIG. 1 it is alternatively possible to use this converter in a transmitter for pulse code modulation in the manner shown in FIG. 3. More particularly the transmitter shown is equipped for conversion of a speech signal into code groups consisting of five pulses, of which the weight of the successive pulses in a code group decreases by a weight factor of 2.

In the transmitter shown the speech signals in the band of, for example, 0.3—3.4 kc./s., derived from a microphone 35 are applied after amplification in an amplifier 36 to a sampler 37 for further handling in the coding device, said sampler being controlled by sampling pulses originating from a local pulse generator 38 and occurring in the rhythm of the code groups, pulses of, for example, positive polarity being generated the amplitude of which varies with the speech signal to be transmitted. In the coding device the output pulses of the sampler 37 are converted into a code group consisting of five pulses and applied, after amplification in an output amplifier 39, to an output line 40.

In the embodiment shown the coding device is provided with a converter already shown in FIG. 1, comprising a capacitor 41, a ladder network 42 connected to the capacitor 41 and having a terminal resistor 43 and three sections 44, 45 46 provided with series resistors 47, 48, 49 and shunt resistors 50, 51, parallel branches 52, 53, 54, 55 being connected to the ends of the sections 44, 45, 46 and connected to output lines of a pulse commutator 56 to which the generated code groups are applied through line 57, while the pulse commutator 56 is controlled by the local pulse generator 38 in the rhythm of the code groups. The output circuit of the sampler 37 is also connected to the capacitor 41.

The converter is constructed in exactly the same manner as shown in FIG. 1, particularly transistors normally blocked are included in the parallel branches 52, 53, 54, 55, said transistors having a common emitter resistor 58 which supplies a constant current pulse whenever a pulse occurs in the associated output line of the pulse commutator 56, while the mutual ratio of the attenuation factors $\alpha$ of the successive sections 44, 45, 46 is also rendered equal to $$2.e^{T_1/R_1C_1},$$

$T_1$ being the time distance between two successive pulses of a code group, $R_1$ being the input resistance of the ladder network 42 and $C_1$ being the capacitance of the capacitor 41.

The coding device is furthermore provided with a reference voltage generator 59 including a capacitor 61 shunted by a resistor 60 and connected to a constant voltage source 62 through a sampler 63 controlled by the local pulse generator 38. The voltage from the capacitor 41 of the converter is compared with the reference voltage of the reference voltage generator 59 in a difference producer 64 and the difference voltage thus produced is supplied to a pulse modulator 65 to which locally generated pulses are also applied which occur in the rhythm of the pulses in the code groups. These locally generated pulses are derived from a frequency multiplier 66 connected to the local pulse generator 38.

Dependent on whether the difference voltage derived from the difference producer 64 has positive or negative polarity, that is to say, the voltage of the capacitor 41 of the converter has a larger or smaller value than the reference voltage, the pulse modulator 64 is released or blocked so that the local pulse applied thereto is passed on or suppressed. On the one hand the output pulses of the pulse modulator 65 are applied to the output amplifier for further transmission along the line 40 and on the other hand to the pulse commutator 56 for further handling in the coding device.

With the device described the code groups characterizing the speech signals to be transmitted are derived from the output of the pulse modulator 65, the weight of the successive pulses decreasing by a weight factor of 2 as will now be explained. In this case the transmitted code groups comprise no more than 5 present pulses the weight factors of which thus amount to $2^4$, $2^3$, $2^2$, $2^1$, $2^0$, respectively.

Starting from the occurrence of a pulse of the pulse generator 38 (sampling instant) the samplers 37, 63 are simultaneously released so that the capacitor 61 of the reference voltage generator 59 is charged to a constant voltage and the capacitor 41 of the converter is charged to a voltage which is determined by the speech signal then occurring after which the two capacitors continuously discharge in accordance with an $e$-power at a speed determined by the relevant time constant. Particularly these time constants are, as already mentioned, $R_1C_1$ for the digital-to-analog converter and $R_2C_2$ for the reference voltage generator, $R_2$ being the value of the resistor 60 and $C_2$ the value of the capacitor 61.

The coding interval commences with the first local pulse towards the pulse modulator 65 occurring after the sampling instant and dependent on the fact whether the voltage from the capacitor 41 is higher or lower at this instant than that of the capacitor 61 of the reference voltage generator 59, the local pulse is either passed on to the pulse modulator 65 or suppressed and then no pulse occurs at the transverse branch 52 through the pulse commutator 56 which pulse, when being present, causes the voltage of the capacitor 41 to decrease in pulsatory manner at a constant value V. Said first pulse, which forms the first pulse of the code group, has a weight of $2^4$ coding units E and is given in value by the voltage value $V$ by which the capacitor 41 is decreased so that the voltage value $V$ becomes $V=2^4\ E$ Independent of the fact whether or not a pulse occurs at the transverse branch 52, the continuous discharge process of the capacitor 41 continues according to the time constant $R_1C_1$, the described process being repeated at the instant of occurrence of the second local pulse towards the pulse modulator 65, particularly this local pulse is either passed on to the pulse modulator 65 or not dependent on whether the voltage of the capacitor 41 of the converter is higher or smaller than that of the capacitor 61 of the reference voltage generator 59. In case this pulse, which thus has a weight of $2^3$ coding units E is passed on it is applied through the pulse commutator 56 to branch 52 of the converter thus causing a pulsatory capacitor discharge having a constant value which now has the mentioned value V divided by the attenuation factor $\alpha$. As stated in the foregoing the attenuation factor $$\alpha = 2.e^{T_1/R_1C_1}.$$

The coding process for the third and fourth pulses continues in completely the same manner and in case these pulses are present with a weight of $2^2$ and $2^1$ coding units E, they are applied to the branches 54, 55 of the converter through the pulse commutator 56, thus causing pulsatory discharges of the capacitor 41, which are $V/\alpha^2$ and $V/\alpha^3$, respectively. After the fifth pulse towards the pulse modulator 65, which thus has a weight of $2^0$ coding units E, the coding process is completed at which the capacitors 41, 61 are discharged through lines 67, 68 of the samplers 37, 63.

When a following pulse of the local pulse generator 38 occurs, the described cycle is repeated and thus the speech signals are characterized by periodical code groups consisting of no more than 5 present pulses, the successive pulses of which successively have a weight of $2^4$, $2^3$, $2^2$, $2^1$, $2^0$ coding units E.

In the coding device described hen using the converter to analog-to-digital conversion is based on a comparison of the voltage of the capacitor 41 of the converter and the voltage of the capacitor 61 of the reference voltage generator 59, the time constant $R_2C_2$ of the reference voltage generator 59 having to be adapted to the time constant $R_1C_1$ of the converter for an accurate analog-to-digital conversion. As will be shown mathematically and with reference to the time diagrams of FIG. 4, particularly the time constant $R_2C_2$ must be chosen o be such that the voltage across the capacitor 61 in the time distance between two successive pulses towards the pulse modulator 65 has decreased by a factor of $$2.e^{T_1/R_1C_1},$$

thus we have the relation:

$$R_2C_2 = \frac{R_1C_1}{1+(R_1C_1/T_1).\ln 2}$$

In FIG. 2*b* the broken line curves F and G show the variation of the voltage across the capacitor 61 of the reference generator 58 which is charged at every sampling instant by the DC voltage source 62 and which subsequently discharges in accordance its time constant $R_2C_2$. In this case the DC voltage source 62 is adjusted in such manner that the capacitor 61 causes voltage during the coding interval which is equal in value to the voltage decrease V of the capacitor voltage of the converter when a pulse occurs at the branch 52 and which as has been stated in the foregoing, is $2^4$ E in coding units.

FIG. 4*a* shows by means of H and J the samplings derived from the sampler 37 at the instants of sampling, which samplings are applied to the capacitor 41 of the converter while FIG. 2*b* shows by means of the curves K and L the voltages of the capacitor 41 of the converter associated with these samplings. Particularly it has been assumed that due to the sampling H the capacitor 41 assumes a voltage at the beginning of the coding interval which is slightly more than 31 coding units E, for example, $31+\delta$ coding units E which voltage when weighted in coding units E can be written according to a weight factor of 2 as:

$(31+\delta)E=(1.2^4+1.2^3+1.2^2+1.2^1+1.2^0+\delta E$

At the instant of starting the coding interval the voltage value $(1.2^4+1.2^3+1.2^2+1.2^1+1.2^0+\delta)E$ of the capacitor 41 of the converter thus is higher than the voltage value $V=2^4E$ of the capacitor 61 of the reference generator 59 so that a pulse is transmitted through the pulse modulator 65 and a pulse is applied through the pulse commutator 56 to the branch 52 which pulse decreases the voltage of the capacitor 41 in a pulsatory manner by a voltage value of $V=2^4E$ so that the voltage of the capacitor 41 then is $(1.2^3+1.2^2+1.2^1+1.2^0+\delta)E$. The two capacitors 41, 61 of the converter and the reference voltage generator 59 respectively discharge in accordance with their time constants $R_1C_1$ and $R_2C_2$ with the result that at the instant of the second pulse in the coding interval the voltage of the capacitor 41 of the converter has decreased to $$(1.2^3+1.2^2+1.2^1+\delta)E.e^{-T_1/R_1C_1}$$

and that of the capacitor 61 of the reference voltage generator has decreased to $$2^3E.e^{-T_1/R_1C_1}.$$

Since the voltage of the capacitor 41 of the converter is higher than that of the capacitor 61 of the reference voltage generator 59, a pulse is again transmitted and applied through the pulse commutator 56 o the branch 53, which pulse causes a pulsatory voltage decrease of the capacitor 41 by $$V/\alpha = 2^3E.e^{-T_1/R_1C_1}$$

so that the voltage of the capacitor 41 of the converter is brought to a value of $$(1.2^2+1.2^1+1.2^0+\delta)E.e^{-T_1/R_1C_1}.$$

At the instant of the third pulse the voltage of the capacitor 41 in the converter is $$(1.2^2+1.2^1+1.2^0+\delta)Ee^{-2T_1/R_1C_1}$$

and that of the capacitor 61 in the reference voltage generator $$2^2E.e^{-2T_1/R_1C_1},$$

so that again a pulse is transmitted by the pulse modulator 65 and applied through the pulse commutator 56 to the branch 54 which pulse causes the voltage of the capacitor 41 to decrease in a pulsatory manner by value of $$V/\alpha^2 = 2^2E.e^{-2T_1/R_1C_1}$$

so that the voltage of the capacitor 41 of the converter is brought to a value of $$(1.2^1+1.2^0+\delta)E.e^{-2T_1/R_1C_1}.$$

At the instants of the fourth and fifth pulses of the pulse modulator 65 the process described is repeated so that the voltage at the capacitor 41 of the converter acquires the waveform shown by curve K in FIG. 4*b* while FIG. 4*c* shows the code group I occurring in the coding interval, formed by five present pulses, which group characterizes the instant of sampling the voltage value of $31E+\delta$, In fact, the transmitted code group of five present pulses shows a voltage value of $(1.2^4+1.2^3+1.2^2+1.2^1+1.2^0)E=31$ E. At the beginning of the coding interval the capacitor 41 of the converter is charged by the sampling J in FIG. 4*a* to a voltage value which, measured in coding units E, is, for example, slightly more than 10E. In exactly the same manner as in the foregoing it can be deduced that the voltage across the capacitor 41 of the converter acquires the waveform shown by curve L in FIG. 4 *b*, while FIG. 4*c* shows by means of II the transmitted code group of which exclusively the second and fourth pulses are present. The code group II then characterizes a voltage value of $(0.2^4+1.2^3+0.2+1.2^1+0.2^2)=10$ E, thus showing digitally the voltage of the capacitor 41 at the instant of sampling.

The transmitted code groups of which the weight of the successive pulses decreases by a weight factor of 2, in each case characterize the voltage of the capacitor 41 at the instant of sampling. Optimum accuracy in coding can then be obtained in that when the converter is adjusted with the aid of the capacitor 41, the network comprising the register 60 and the capacitor 61 is also made adjustable, for example, the capacitor 61 and also the DC-voltage source 62. In practice it can here also be said that the coding device is exclusively dependent on passive elements, namely the DC-voltage source 62 can be stabilized accurately by means of Zener diodes or gas filled tubes.

The following data are mentioned below of a device of the type described and extensively tested in practice:

| | | | |
|---|---|---|---|
| Resistors **47, 48, 49**: | 5.6 kOhms | Resistor **60**: | 2.7 kOhms |
| Resistor **50, 51** | 8.2 kOhms | Capacitor **61**: | $10^4$ pf. |
| Resistor **43**: | 3.9 kOhms | | |
| Capacitor **41**: | $10^4$ pf. | | |

Also in this device the time constant $R_1C_1$ is rendered equal to the duration of a code group and the time distance of sampling for obtaining an optimum efficiency of conversion.

Finally it is noted that the reference voltage can alternatively be generated in a different manner instead of in the network described consisting of a register 60 and a capacitor 61. Particularly to this end the described converter may be used which consists of a capacitor having a ladder network connected thereto, a plurality of parallel connected branches being connected to the ends of the sections of the ladder network, said branches being controlled by pulses through a pulse commutator in he manner described hereinbefore, which pulses occur in he rhythm of the successive pulses in a code group. It should then be ensured by suitable proportioning that the capacitor voltage at the instants of a pulse corresponds to the voltage values at these instants shown by the curve F nd G in FIG. 2*b*.

We claim:

1. A converter for a group of weighted sequential pulses comprising a commutator means having a plurality of output lines for distributing said pulses among said lines; plurality of pulse circuits coupled to said output lines respectively an energy source coupled to said pulse circuits; a plurality of parallel coupled register networks coupled to said pulse circuits respectively; a capacitor coupled to one of said networks; and a sampler coupled to said capacitor and synchronized with said sequential pulses; means responsive to the occurrence of one of said pulses for directing energy from said energy source through a respective one of said pulse circuits and through said resistor network to charge said capacitor to a value depending upon the position of said pulse in said pulse group.

2. A converter as claimed in claim 1 wherein each of said pulse circuits comprises transistor having two conduction and a control electrode, said control electrode being coupled to one of said output lines and coupled to receive blocking voltage, said conduction electrodes being coupled to said energy source and said resistor network respectively; and a common resistor coupled between said energy source and one of said conduction electrodes in all of said transistors.

3. A converter as claimed in claim 1 wherein said parallel coupled register networks comprise ladder network and a terminal resistor, the attenuation ratio between any two adjacent sections of said ladder network being a constant.

4. A converter as claimed in claim 1 wherein said capacitor comprises variable capacitor.

5. A converter as claimed in claim 1 wherein said pulse circuits are coupled to said respective resistor networks in accordance with the weight of the pulses applied thereto.

6. A converter s claimed in claim 1 wherein said capacitor and resistor network have time constant substantially equal to the time duration of said pulse group plus the sample time.

7. A converter as claimed in claim 3 wherein said attenuation ratio substantially equals 2 exp $(T_1/R_1C_1)$, wherein $T_1$ is the time between successive pulses within a group, $C_1$ is the capacitance of said capacitor, and $R_1$ is the equivalent resistance of said parallel coupled resistor networks.

8. A converter as claimed in claim 1 further comprising a reference voltage generator; a difference producer having inputs coupled to said reference voltage generator and said capacitor respectively, and an output; a pulse modulator having an input coupled to said difference signal producer output and an output coupled to said commutator means, a pulse generator coupled to said pulse modulator.

9. A converter as claimed in claim 8 wherein said reference voltage generator comprises second capacitor, a third resistor coupled in parallel with said second capacitor, a voltage source, and a sampler coupled between said second capacitor and said voltage source, said sampler being synchronized with said pulse generator.

10. A converter is claimed in claim 8 herein during the occurrence of the first pulse of said pulse group the voltage of said reference voltage generator substantially equals the weight factor of said first pulse multiplied by the coding unit *E*.

11. A converter as claimed in claim 8 wherein the voltage of said reference pulse generator decreases between successive pulse by a factor 2 exp $(T_{bu}\ {}_1RC_1)$, wherein $T_1$ is the time between successive pulses $C_1$ is the capacitance of said first recited capacitor, and $R_1$ is the equivalent resistance of said parallel coupled resistor networks.